US009059597B2

(12) United States Patent
Woo et al.

(10) Patent No.: US 9,059,597 B2
(45) Date of Patent: Jun. 16, 2015

(54) REDUCTION OF LEAKAGE CURRENT IN MOBILE DEVICE WITH EMBEDDED BATTERY

(75) Inventors: Sungho Woo, Gyeonggi-Do (KR); Jaeyoung Choi, Seoul (KR); Hoon Jo, Gyeonggi-Do (KR); Hyeonchang Choi, Gyeonggi-Do (KR); Jongseok Park, Gyeonggi-Do (KR); Okhyun Jeong, Seoul (KR); Giwon Kang, Seoul (KR); Hong Jo Shim, Seoul (KR); Jungseok Lee, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 928 days.

(21) Appl. No.: 13/234,006

(22) Filed: Sep. 15, 2011

(65) Prior Publication Data

US 2012/0213135 A1 Aug. 23, 2012

Related U.S. Application Data

(63) Continuation-in-part of application No. 13/042,380, filed on Mar. 7, 2011, now Pat. No. 8,824,346.

(60) Provisional application No. 61/445,975, filed on Feb. 23, 2011.

(30) Foreign Application Priority Data

Apr. 12, 2011 (KR) .................. 10-2011-0033936

(51) Int. Cl.
*H02J 7/02* (2006.01)
*G06F 1/32* (2006.01)

(52) U.S. Cl.
CPC .............. *H02J 7/025* (2013.01); *G06F 1/3209* (2013.01); *G06F 1/3287* (2013.01); *Y02B 60/1282* (2013.01)

(58) Field of Classification Search
CPC ....... G06F 1/3209; G06F 1/3287; H02J 7/025
USPC ........................................................ 370/311
See application file for complete search history.

(56) References Cited

U.S. PATENT DOCUMENTS 7,208,916 B1 4/2007 Boatwright et al.
8,618,934 B2 12/2013 Belov et al.
(Continued)

FOREIGN PATENT DOCUMENTS

CN 101668350 3/2010
CN 1698339 6/2010

OTHER PUBLICATIONS

U.S. Appl. No. 13/042,380, Office Action dated May 6, 2013, 34 pages.

(Continued)

*Primary Examiner* — Jae Y Lee
(74) *Attorney, Agent, or Firm* — Lee, Hong, Degerman, Kang & Waimey

(57) ABSTRACT

Systems, circuits, and devices for reducing leakage current in a mobile device with an embedded battery are disclosed. In one embodiment, a system for reducing leakage current in a mobile device with an embedded battery comprises a power management integrated circuit (PMIC), a switch device electrically coupled to the embedded battery and the PMIC, and a low power personal area network (PAN) module coupled to the embedded battery, the PMIC, and the switch device. The low power PAN module is configured to maintain the switch device in an open state while an application processor (AP) of the mobile device is off and to close the switch device in response to a receipt of an AP ON request signal to wake up the AP, where the open state of the switch device blocks leakage current flowing from the battery to the PMIC.

20 Claims, 13 Drawing Sheets

(56) References Cited

U.S. PATENT DOCUMENTS

| | | |
|---|---|---|
| 8,775,126 B2 | 7/2014 | Yang |
| 2004/0121802 A1* | 6/2004 | Kim et al. .................. 455/556.2 |
| 2005/0138138 A1 | 6/2005 | Jelinek et al. |
| 2006/0112287 A1 | 5/2006 | Paljug |
| 2007/0205872 A1 | 9/2007 | Kim et al. |
| 2008/0067995 A1* | 3/2008 | Chua-Eoan et al. .......... 323/284 |
| 2009/0174366 A1* | 7/2009 | Ahmad et al. ................ 320/114 |
| 2010/0022217 A1 | 1/2010 | Ketari |
| 2010/0039284 A1 | 2/2010 | Hall et al. |
| 2010/0205467 A1 | 8/2010 | Park |
| 2010/0304761 A1 | 12/2010 | Seibert et al. |
| 2011/0021142 A1* | 1/2011 | Desai et al. .................. 455/41.2 |
| 2011/0086615 A1 | 4/2011 | Golder |
| 2011/0148349 A1 | 6/2011 | Kim et al. |
| 2012/0023236 A1 | 1/2012 | Backholm et al. |
| 2012/0303476 A1 | 11/2012 | Krzyzanowski et al. |
| 2012/0315845 A1 | 12/2012 | Buczek |

OTHER PUBLICATIONS

U.S. Appl. No. 13/277,056, Final Office Action dated May 1, 2014, 19 pages.
U.S. Appl. No. 13/277,056, Notice of Allowance dated Aug. 19, 2014, 8 pages.
U.S. Appl. No. 13/277,056, Office Action dated Oct. 18, 2013, 15 pages.
The State Intellectual Property Office of the People's Republic of China Application Serial No. 201110187018.3, Office Action dated Nov. 11, 2013, 9 pages.
U.S. Appl. No. 13/233,977, Office Action dated Jan. 16, 2014, 24 pages.

* cited by examiner

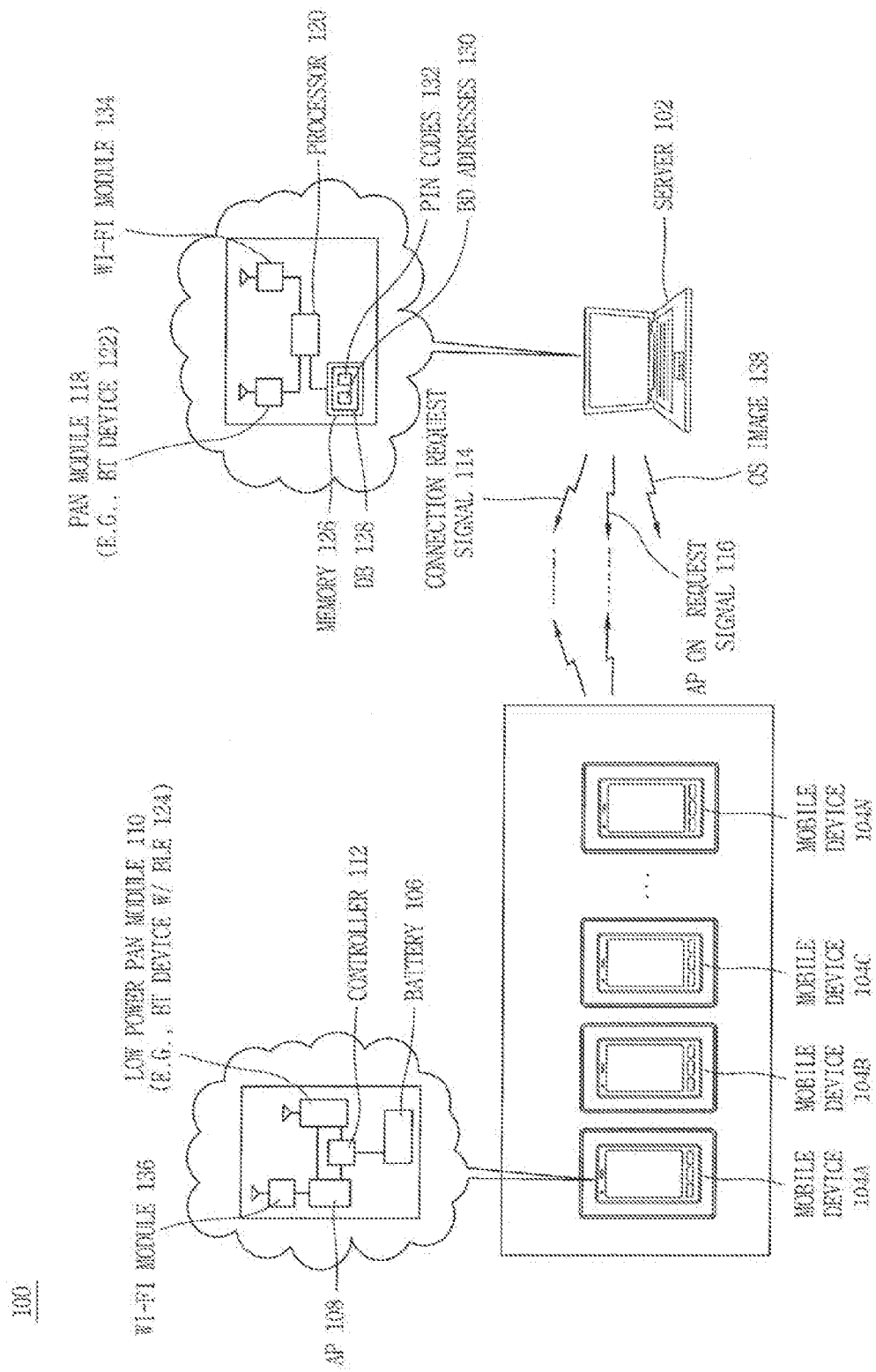

REDUCTION OF LEAKAGE CURRENT IN MOBILE DEVICE WITH EMBEDDED BATTERY

CROSS-REFERENCE TO RELATED APPLICATIONS

This application is a continuation-in-part application of U.S. patent application Ser. No. 13/042,380, filed on Mar. 7, 2011, now U.S. Pat. No. 8,824,346, which pursuant to 35 U.S.C. §119(e), claims the benefit of U.S. Provisional Patent Application Ser. No. 61/445,975, filed on Feb. 23, 2011, the contents of which are hereby incorporated by reference herein in their entirety. Pursuant to 35 U.S.C. §119(a), this application also claims the benefit of earlier filing date and right of priority to Korean Patent Application No. 10-2011-0033936 filed on Apr. 12, 2011.

TECHNICAL FIELD

Embodiments of the disclosure generally relate to the field of electronics, and more particularly to control systems, circuits, and devices.

BACKGROUND

A mobile device is a pocket-sized computing device, typically having a display screen with touch input and/or a miniature keyboard. Some of the types of the mobile device include a mobile phone, a personal digital assistant (PDA), a tablet PC, a laptop, etc. As today's mobile devices become ever more dependant on their software, as in the case of smart phones, software upgrade to fix bugs or enhance the features of the mobile devices is becoming increasingly frequent. For example, companies are offering new versions of the smart phones twice year, where the new versions may have new and/or upgraded software and/or hardware features. The upgraded smart phones may be packaged and stored as an inventory until they are shipped out and sold to the consumers.

However, while the smart phones are in stock, a bug or flaw may be found with a certain software feature of the smart phones, such as the OS of the smart phones. In that case, the companies may manually take out the smart phones from their package, power up the application processor (AP) of each mobile phone, and then download a bug-free OS to each mobile phone.

SUMMARY

This summary is provided to comply with 37 C.F.R. §1.73, requiring a summary of the disclosure briefly indicating the nature and substance of the disclosure. It is submitted with the understanding that it will not be used to interpret or limit the scope or meaning of the claims.

Systems, circuits, and devices for reducing leakage current in a mobile device with an embedded battery are disclosed. In one aspect, a system for reducing leakage current in a mobile device with an embedded battery comprises a power management integrated circuit (PMIC), a switch device electrically coupled to the embedded battery and the PMIC, and a low power personal area network (PAN) module coupled to the embedded battery, the PMIC, and the switch device. The low power PAN module is configured to maintain the switch device in an open state while an application processor (AP) of the mobile device is off and to close the switch device in response to a receipt of an AP ON request signal to wake up the AP, where the open state of the switch device blocks leakage current flowing from the battery to the PMIC.

In another aspect, a mobile device comprises an embedded battery, a power management integrated circuit (PMIC), an application processor (AP) coupled to the PMIC, a switch device electrically coupled to the embedded battery and the PMIC, and a low power personal area network (PAN) module coupled to the embedded battery, the PMIC, and the switch device. The low power PAN module is configured to maintain the switch device in an open state while the AP of the mobile device is off and to close the switch device in response to a receipt of an AP ON request signal to wake up the AP, where the open state of the switch device blocks leakage current flowing from the battery to the PMIC.

Other features of the embodiments will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 1 illustrates an exemplary system for remotely waking up an application processor of a mobile device, according to one embodiment.

Figure 2A:
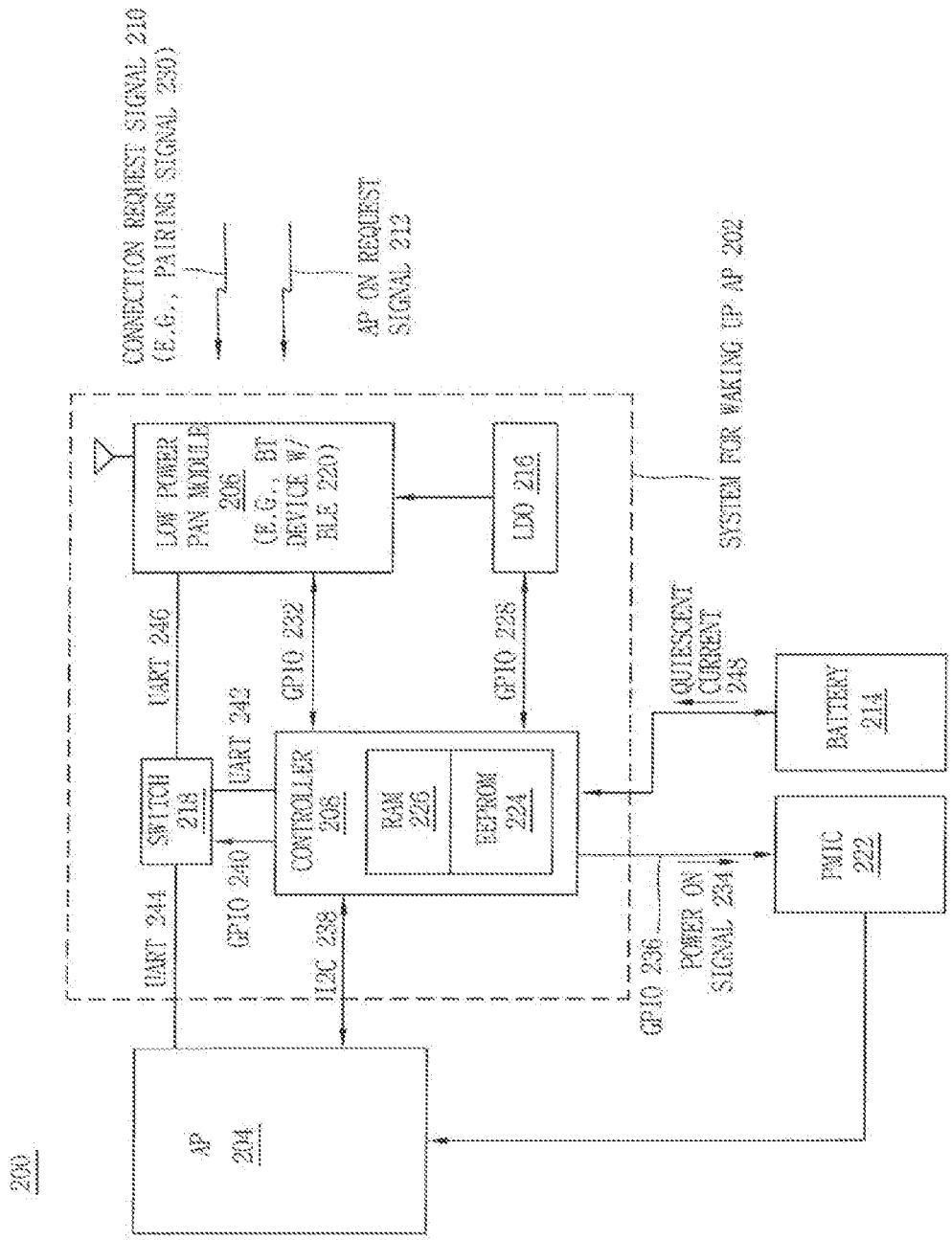
FIG. 2A illustrates an exemplary system for waking up an application processor (AP) of a mobile device, according to one embodiment.

Other features of the present embodiments will be apparent from the accompanying drawings and from the detailed description that follows. Further, the drawings described herein are for illustration purposes only and are not intended to limit the scope of the present disclosure in any way.

DETAILED DESCRIPTION

A method, device and/or system are disclosed that remotely wake up an application processor (AP) of a mobile device. According to embodiments of this disclosure, a system of a mobile device for waking up an AP of a mobile device includes a low power personal area network (PAN) module and a controller of the low power PAN module, where the system is supported by an embedded battery of the mobile device for several months. The long battery life of the mobile terminal may be possible by maintaining the system for waking up the AP of the mobile device in standby mode, where minimal amount of power is drawn from the embedded battery during the standby mode. While the system is in the standby mode, the controller of the system may monitor a signal from an external device so that it can turn on the AP in response to an AP on request signal when the external device is verified.

In addition, the battery life of the mobile terminal is even further prolonged by reducing leakage current flowing from the embedded battery using the low power PAN module. In one embodiment, a switch device is implemented between the embedded battery and a power management integrated circuit of the mobile device, where the switch device is controlled by the low power PAN module, such as a Bluetooth device with Bluetooth Low Energy (BLE) feature or a BLE device. The low power PAN module is configured to maintain the switch device in an open state while the AP of the mobile device is off and to close the switch device in response to a receipt of an AP ON request signal to wake up the AP. As a result, a leakage current, which would have flown from the embedded battery to the PMIC, is blocked when the switch device remains in the open state. Thus, various embodiments of the present disclosure aim to reduce power consumed by the mobile device through monitoring the AP ON signal using a low power PAN module, such as the BLE device which draws significantly less current than the AP and through reducing leakage current drawn by several components of the mobile device from the embedded battery.

Reference will now be made in detail to the embodiments of the disclosure, examples of which are illustrated in the accompanying drawings. While the disclosure will be described in conjunction with the embodiments, it will be understood that they are not intended to limit the disclosure to these embodiments. On the contrary, the disclosure is intended to cover alternatives, modifications and equivalents, which may be included within the spirit and scope of the disclosure. Furthermore, in the detailed description, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure aspects of the present disclosure.

FIG. 1 illustrates an exemplary system 100 for remotely waking up application processors of mobile devices 104A-N, according to one embodiment. In one embodiment, the system 100 comprises a server 102 and the multiple mobile devices 104A-N. It is appreciated that the server 102 may be a work station, a desktop, a laptop, a tablet PC, etc. which functions as the master device. It is further appreciated that each of the multiple mobile devices 104A-N may function as a slave device. Each of the multiple mobile devices 104A-N comprises a battery, an application processor (AP), a low power personal area network (PAN) module, and a controller for the low power PAN module. For example, the mobile device 104A comprises a battery 106, an AP 108, and a low power personal area network (PAN) module 110 configured to communicate with the server 102 for establishing a connection with the server 102. It is appreciated that the low power PAN module may be a wireless IrDA, Bluetooth, UWB, Z-Wave and ZigBee which is designed to consume minimal amount of power. For example, a BT device with Bluetooth low energy (BLE) feature may consume a fraction (e.g., 1 to 5 percent) of the power of conventional BT device. It is further appreciated that the AP or application processor may be a system on chip (SoC) which include one or more of core(CPU), memory, display system/controller, multimedia en/decoding codec, 2D/3D accelerator engine, ISP(Image Signal Processor), camera, audio, modem, various high & low speed serial/parallel connectivity interface, etc.

The mobile device 104A further comprises a controller 112 for the low power PAN module 110 configured to process a connection request signal 114 from the server 102 and to wake up the AP 108 of the mobile device 104A in response to an AP on request signal 116 from the server 102 when the connection request signal 114 from the server 102 is verified as valid. The controller 112 is supplied with quiescent or insignificant current from the battery 106 of the mobile device 104A prior to the wake up of the AP 108. It is appreciated that each of the remaining mobile devices 104B-N comprises the same or equivalent features described in regard to the mobile device 104A.

In one embodiment, the server 102 comprises a PAN module 118 and a processor 120 configured to generate the connection request signal 114 and the AP on request signal 116. Alternatively, the PAN module 118 may be implemented as a dongle that can be freely attached or detached based on the need. In one exemplary implementation, the PAN module 118 of the server 102 comprises a Bluetooth (BT) device 122, and the low power PAN module 110 of the mobile device 104A comprises a BT device with BLE feature 124. The server 102 further comprises a memory 126 which stores a database (DB) 128 comprising addresses of Bluetooth devices with BLE feature (BD addresses) 130 for the mobile devices 104A-N and personal identification number (PIN) codes 132 designated for the mobile devices 104A-N, respectively. It is appreciated that the BD addresses 130 may store the network addresses of BT enabled devices, such as the devices 104A-N. The BD addresses 130 may be a unique number (e.g., in 48 bits) used to identify a particular device during operations such as connecting to, pairing with, or activating the device.

In one embodiment, a pairing of the server 102 and each of the mobile devices 104A-N is performed based on the BD addresses 130 and the PIN codes 132 designated for the mobile devices 104A-N. In one exemplary implementation, each of the PIN codes 132 may be a 4-digit personal ID code based on the serial number of the mobile device and/or the version of OS to be downloaded to the mobile device. The server 102 is configured to request the connection with the server 102 to each mobile device (e.g., the mobile device 104A) according to a particular profile dictated by the server 102, and each mobile device is configured to accept the request. In addition, the server 102 and each mobile device are configured to implement a protocol for the wake up of a corresponding AP (e.g., the AP 108).

Further, each mobile device is configured to perform the wake up of its AP upon receipt of its AP on request signal. The controller of each mobile device is configured to measure a level of its battery upon receipt of the AP on request signal, and the wake up of the AP is performed when the level of the battery is higher than a threshold level. For example, the controller 112 of the mobile device 104A is configured to measure the level of the battery 106 upon receipt of the AP on request signal 116, and the wake up of the AP 108 is performed when the level of the battery 106 is higher than a threshold level. In case the level of the battery 106 is lower than the threshold level, the mobile device may forward its status report to the server 102 without turning on the AP 108.

Further, the server 102 further comprises a Wi-Fi module 134, and each mobile device comprises a Wi-Fi module. For example, the mobile device 104A comprises a Wi-Fi module 136. In one embodiment, a download of an OS image 138 stored in the server 102 to each mobile device is performed via the Wi-Fi module 134 of the server 102 and the Wi-Fi module of each mobile device. In one exemplary implementation, the controller for the low power PAN module may be disabled when the download of the OS image is completed or the subject mobile device is in use.

Although the system 100 of FIG. 1 is described in terms of single server and each mobile device, it is appreciated that the process of connecting the mobile device 104A and performing a task remotely commanded by the server 102 may be simultaneously or serially performed for all of the mobile devices 104A-N. For example, if the low power PAN module in each mobile device is a BT device with BLE feature, the server 102, which is the master device, may form a piconet with seven slave devices, such as seven BT devices with BLE feature. Accordingly, the server 102 and the seven BT devices may communicate in serial or parallel to connect and wake up a corresponding AP of each mobile device. Alternatively, more than eight devices may be connected based on a scatternet so that the communication between the server 102 and the mobile devices can be performed in a rapid fashion.

FIG. 2A illustrates an exemplary system for waking up an application processor (AP) 202 of a mobile device 200, according to one embodiment. It is appreciated that the mobile device 200 is an exemplary embodiment of the mobile device 104A or any one of the mobile devices 104B-N in FIG. 1. In one embodiment, the system 202 comprises a low power personal area network (PAN) module 206 configured to communicate with an external device for establishing a connection with the external device. The system 202 further comprises a controller 208 for the low power PAN module 206 configured to process a connection request signal 210 from the external device and to wake up an AP 204 of the mobile device 200 in response to an AP on request signal 212 from the external device when the connection request signal 210 from the external device is verified as valid, where the controller 208 is supplied with quiescent current from a battery 214 of the mobile device 200 prior to the wake up of the AP 204.

The system 202 also comprises a low dropout regulator (LDO) 216 configured to maintain a voltage supplied to the low power PAN module 206. The system 202 further comprises a switch 218 configured to open a connection between the AP 204 and the low power PAN module 206 prior to the wake up of the AP 204 and to close the connection upon the wake up of the AP 204. In one exemplary implementation, the low power PAN module 206 comprises a Bluetooth device with BLE feature 220.

In one embodiment, the mobile device 200 comprises the battery 214, the AP 204, the low power PAN module 206, and the controller 208. The mobile device 200 further comprises the LDO 216, the switch 218, and a power management integrated circuit (PMIC) 222 configured to control a power supplied to the AP 204. It is appreciated that the mobile device 200 is an exemplary implementation of any one of the mobile devices 104A-N.

In one embodiment, the controller 208 is initialized when the battery 214 is installed to the mobile device 200. For example, during the initialization, the setting for general purpose input/outputs (GPIOs) of the controller 208 and the profile of the BT device with BLE feature 220 stored in EEPROM 224 of the controller 208 may be loaded to a RAM 226 of the controller 208. Further, the controller 208 is configured to perform a power on sequence of the Bluetooth device with BLE feature 220 by controlling the LDO 216 via a general purpose input/output (GPIO) 228 of the controller 208. The controller 208 is also configured to perform a pairing with the external device based on a pairing request 230 from the external device forwarded via a GPIO 232 of the controller 208. Prior to the powering up of the AP 204, the system for waking up AP 202 may be maintained with a quiescent current 248 supplied by the battery 214.

The controller 208 is further configured to forward a power on signal 234 via a GPIO 236 to the PMIC 222 to wake up the AP 204 in response to the AP on request signal 212 from the external device. Moreover, the controller 208 is configured to operate the switch 218 (e.g., using GPIO 240 and/or UART 242) to transfer a control of the Bluetooth device with BLE feature 220 to the AP 204. Subsequently, data is communicated directly between the AP 204 and the BT device with BLE feature 220. In one exemplary implementation, the controller 208 may be physically separate from the low power PAN module 206. In another exemplary implementation, the controller 208 may be a part of the low power PAN module 206 together with the LDO 216 and the switch 218. In yet another exemplary implementation, the controller 208 may be a part of the AP 204, yet islanded within the AP 204 so that the controller 208 can be operated without waking up the AP 204 prior to the receipt of the AP on request 212 from the external device.

Figure 2B:
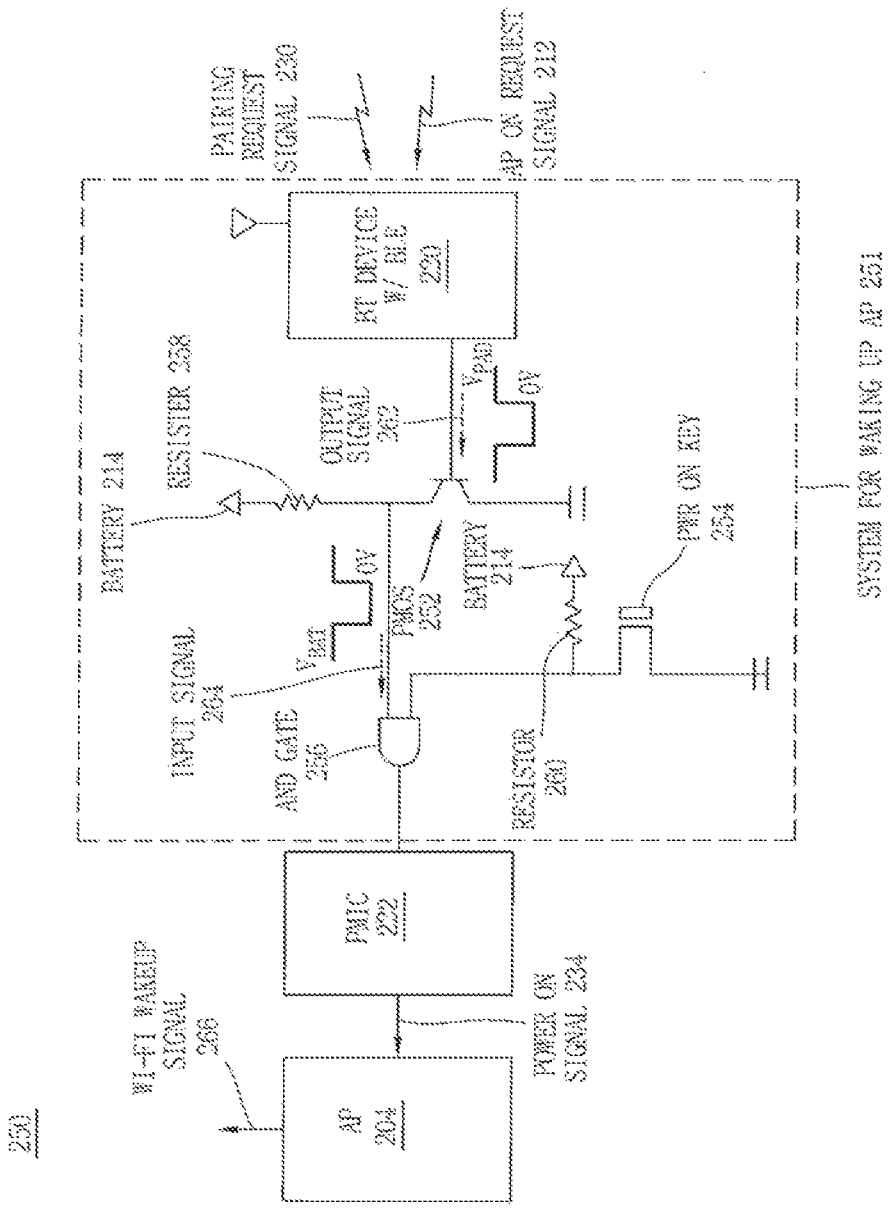
FIG. 2B illustrates another exemplary system for waking up an application processor of a mobile device, according to one embodiment.

FIG. 2B illustrates another exemplary system for waking up an application processor 251 of a mobile device 250, according to one embodiment. It is appreciated that the mobile device 250 is an exemplary embodiment of the mobile device 104A or any one of the mobile devices 104B-N in FIG. 1. In FIG. 2B, the system 251 comprises the BT device with BLE feature 220 which is configured to communicate with an external device to connect with the external device. In addition, the system 251 comprises a hardware module (system or circuit) for processing the pairing request signal 230 from the external device, and waking up the AP 204 of the mobile device 250 in response to the AP ON request signal 212 from the external device if the pairing request signal 230 is determined to be valid. In one embodiment, the hardware module comprises a PMOS 252, a power (PWR) on key 254, and an AND gate 256. The gate node of the PMOS 252 is connected to an output port of the BT device with BLE feature 220, and the source node of the PMOS 252 is connected to the battery 214 through a resistor 258. In addition, the output port of the AND gate 256 is connected to an input port of the PMIC 222. Further, one input port of the AND gate 256 is connected to the source node of the PMOS 252, and the other input port of the AND gate 256 is connected to the PWR ON KEY 254 and to the battery 214 through a resistor 260.

In one embodiment, the BT device with BLE feature 220 of the system for waking up AP 251 generates an output signal 262 with a high, low, delay, and high pattern upon a receipt of the AP ON request signal 212 when the pairing request signal 230 is determined as valid. In one exemplary implementation, the level of the high in the output signal 262 is equivalent to that of $V_{PAD}$ for the BT device with BLE feature 220. The PMOS 252 then amplifies the output signal 262 to an input signal 264, where the level of the high in the input signal 264 is adjusted from $V_{PAD}$ to $V_{VAT}$. The input signal 264 is then fed to the input port of the AND gate 256 and to the input port of the PMIC 222 which generates the POWER ON signal 234 and wakes up the AP 204.

That is, the BT device with BLE feature 220 supplies $V_{PAD}$ to the gate node of the PMOS 252 until the AP ON request signal 212 is received, but generates the output signal 262 in the pattern as described above in response to the AP ON request signal 212 to control the PMIC 222 which is configured to generate the POWER ON signal 234 to wake up the AP 204 in response to the receipt of the input signal 264. In one exemplary, the PMIC 222 may generate the POWER ON signal 234 only when the input signal 264 is of the high, low, delay, high pattern with the delay of more than three (3) seconds. However, a delay with a different duration may be employed as the input signal 264.

In FIG. 2B, when the PWR ON KEY 254 is operated by a user to enter the input signal 264 of the pattern described above to the AND gate 256, the PMIC 222 wakes up the AP 204 through generating and forwarding the POWER ON signal 234. In addition, the AP 204, once awakened, may generate a Wi-Fi wake up signal 266 to wake up a Wi-Fi module of the mobile device 250 to perform one or more tasks. For example, prior to the wake up of the AP 204, the mobile device 250 may maintain a standby mode through supplying quiescent current from the battery 214 to the system 251 which includes the BT device with BLE feature 220 as well as the hardware module, thus reducing the power consumption of the battery 214. It is appreciated that the system for waking up AP 251 may be realized with a different combination of components, although FIG. 2B illustrates the system 251 with the PMOS 222 and so forth.

Figure 2C:
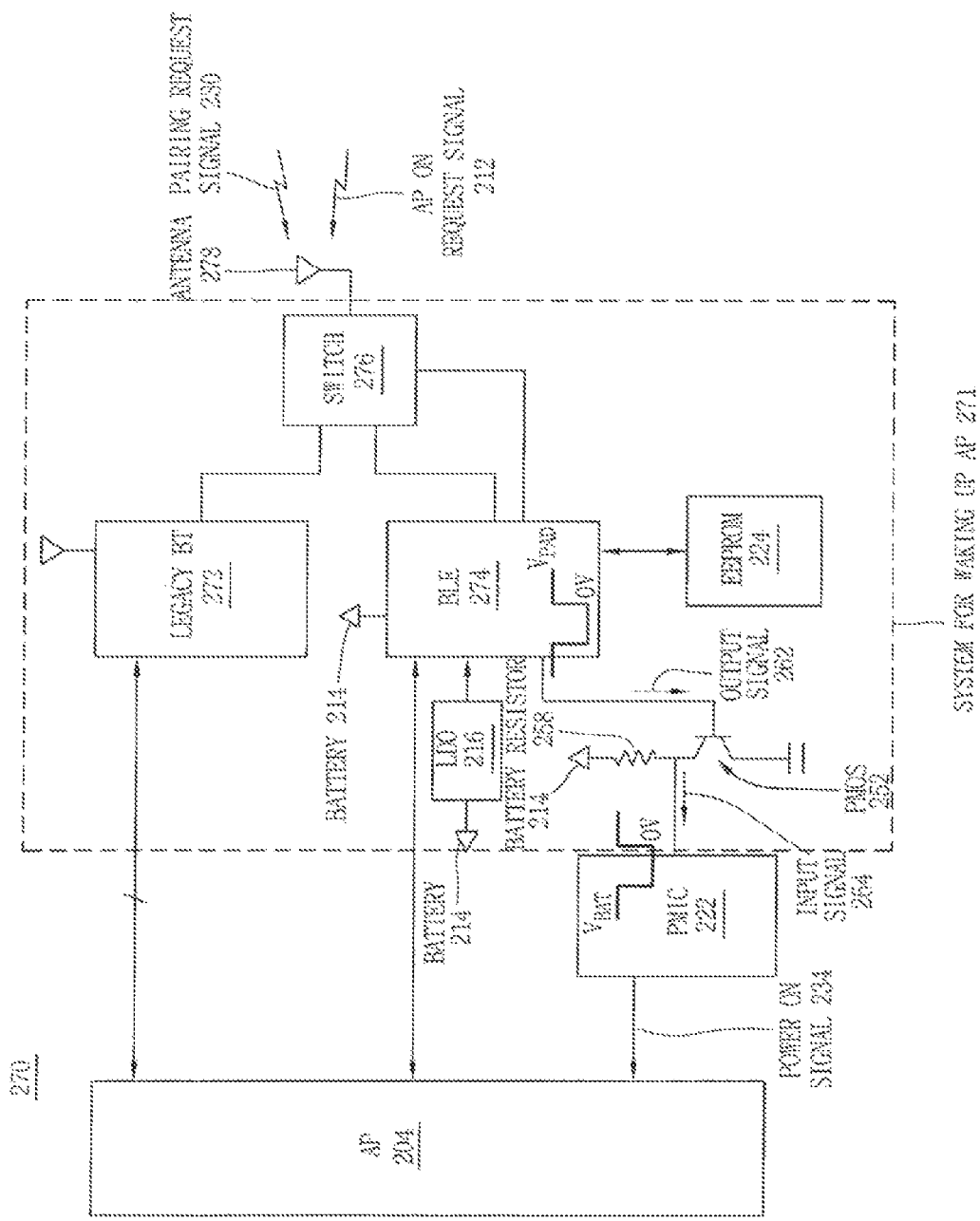
FIG. 2C illustrates yet another exemplary system for waking up an application processor of a mobile device, according to one embodiment.

FIG. 2C illustrates yet another exemplary system of a mobile device for waking up an application processor of a mobile device, according to one embodiment. It is appreciated that the mobile device 270 is an exemplary embodiment of the mobile device 104A or any one of the mobile devices 104B-N in FIG. 1. In FIG. 2C, the system 271 comprises a legacy BT device 272 which is configured to connect and communicate with an external device when the AP 204 of the mobile device 270 is operational and a BLE device 274 which is configured to monitor the pairing request signal 230 from the external device while the AP 204 of the mobile device 270 turned off until there is the AP ON request signal 212 from the external device. In addition, the system 271 comprises a hardware module (system or circuit) for forwarding the AP ON request signal 212 received from the external device via the BLE device 274 if the pairing request signal 230 is determined to be valid. In one embodiment, the hardware module comprises the PMOS 252 and/or other components. The gate node of the PMOS 252 is connected to an output port of the BLE device 274, the source node of the PMOS 252 is connected to the battery 214 through the resistor 258, and the drain node of the PMO 252 is connected to the ground. In addition, the source node of the PMOS 252 is connected to the input port of the PMIC 222.

Further, the system 271 comprises a switch 276 coupled to the legacy BT 272, the BLE device 274, and an antenna 278. In one embodiment, the switch 276, which may be controlled by the BLE device 274, maintains the connection of the BLE device 274 with the antenna 278 until the AP 204 is turned on. The BLE device 274 generates the output signal 262 with a high, low, delay, and high pattern upon a receipt of the AP ON request signal 212 from the external device when the pairing request signal 230 from the external device is determined to be valid. In one exemplary implementation, the level of the high in the output signal 262 is equivalent to that of $V_{PAD}$ for the BLE device 274. The PMOS 252 then amplifies the output signal 262 to the input signal 264, where the level of the high in the input signal 264 is adjusted from $V_{PAD}$ to $V_{VAT}$. The input signal 264 is then fed to the PMIC 222 which generates the POWER ON signal 234 and wakes up the AP 204.

That is, the BLE device 274 supplies $V_{PAD}$ to the gate node of the PMOS 252 until the AP ON request signal 212 is received, but generates the output signal 262 in the pattern as described above only in response to the AP ON request signal 212 to control the PMIC 222 which is configured to generate the POWER ON signal 234 to wake up the AP 204 in response to the receipt of the input signal 264. In one exemplary implementation, the PMIC 222 may generate the POWER ON signal 234 only when the input signal 264 is of the high, low, delay, high pattern with the delay of more than three (3) seconds. However, a delay with a different duration may be employed as the input signal 264. Further, prior to the wake up of the AP 204, the mobile device 270 may maintain a standby mode through supplying quiescent current from the battery 214 to the system 271 which includes the BLE device 274 and/or other components through the LDO 216, thus reducing the power consumption of the battery 214. It is appreciated that the system for waking up AP 271 may be realized with a different combination of components, although FIG. 2C illustrates the system 271 with the PMOS 252 and so forth.

Figure 3A:
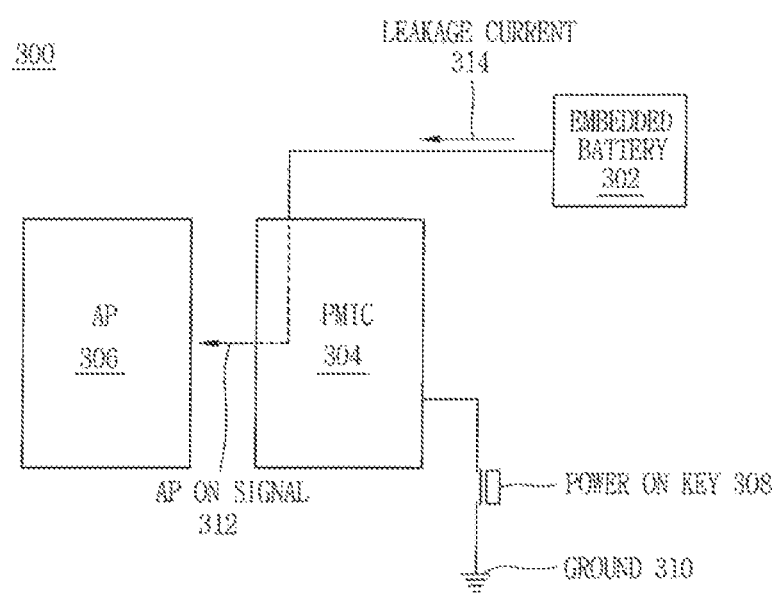
FIG. 3A illustrates a conventional system in a mobile device for turning on an application processor of the mobile device using a power on key.

FIG. 3A illustrates a conventional system 300 of a mobile device for turning on an application processor (AP) 306 of the mobile device using a power on key 308. When the power on key 308 is operated by a user to turn on the AP 306, a signal with a pattern of 'high, low, delay high' is supplied to a power management integrated circuit (PMIC) 304. Then, the PMIC 304 wakes up the AP 306 through generating and forwarding an AP ON signal 312.

In a number of mobile devices that are currently on the market, the batteries are embedded in the mobile devices, where the batteries may not be user replaceable. The embedded batteries may be preferable since they reduce a number of incidences that may be caused from replacing the batteries on the mobile devices, or they contribute the mobile devices to go slimmer. However, even if the mobile devices with the embedded batteries are turned off, the embedded batteries may be slowly discharged. For example, in the conventional system 300 comprising an embedded battery 302 may have leakage current flowing from the embedded battery 302 to the PMIC 304 which is directly connected to the embedded battery 302 via a low dropout regulator (LDO) implemented within the PMIC 304. For example, the leakage current may be in the range of several hundred micro-amperes (uA). As a result, when the mobile devices with the fully or nearly discharged embedded batteries are sold to the users, the mobile devices may not be powered up until the users spend several hours to charge up the embedded batteries of the mobile devices, thus causing a significant time and inconvenience to the users.

Figure 3B:
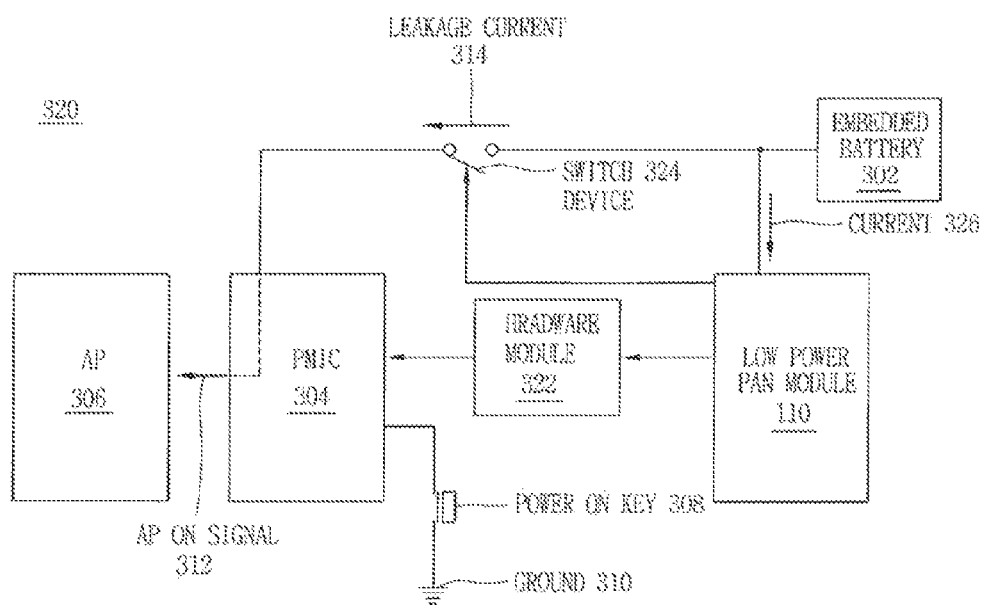
FIG. 3B illustrates an exemplary system for reducing leakage current flowing from an embedded battery of a mobile device to a power management integrated circuit of the mobile device, according to one embodiment.

FIG. 3B illustrates an exemplary system 320 for reducing leakage current 314 flowing from the embedded battery 302 of a mobile device to the PMIC 304 of the mobile device, according to one embodiment. In FIG. 3B, the system 320 comprises the PMIC 304, a switch device 324 electrically coupled to the embedded battery 302 and the PMIC 304, and the low power PAN module 110 coupled to the embedded battery 302, the PMIC 304, and the switch device 324. In one embodiment, the low power PAN module 110 may be a BLE device such that the amount of power consumed by the BLE device (e.g., about 30 uA) may be significantly less than the amount of leakage current resulted in the conventional system 300 (e.g., in several hundred uA) in FIG. 3A.

In one embodiment, the low power PAN module 110 is configured to maintain the switch device 324 in an open state while the AP 306 of the mobile device is off and to close the switch device 324 in response to a receipt of an AP ON request signal to wake up the AP 306. As a result, the leakage current 314, which would have flown from the embedded battery 302 to the PMIC 304 as in the case of the conventional system 300 in FIG. 3A, is blocked when the switch device 324 remains in the open state. In one exemplary implementation, the opening of the switch device 324 may be controlled by the low power PAN module 110 where a signal from a general purpose input output (GPIO) port of the low power PAN module 110 may be forwarded to maintain the switch device 324 in the open state until an AP ON request signal is received by the low power PAN module 110. Additionally, the GPIO port of the low power PAN module 110 may forward another signal to close the switch device 324 upon the receipt of the AP ON request signal so that the PMIC 304 may be supplied with power from the embedded battery 302 for its operation.

Figure 3C:
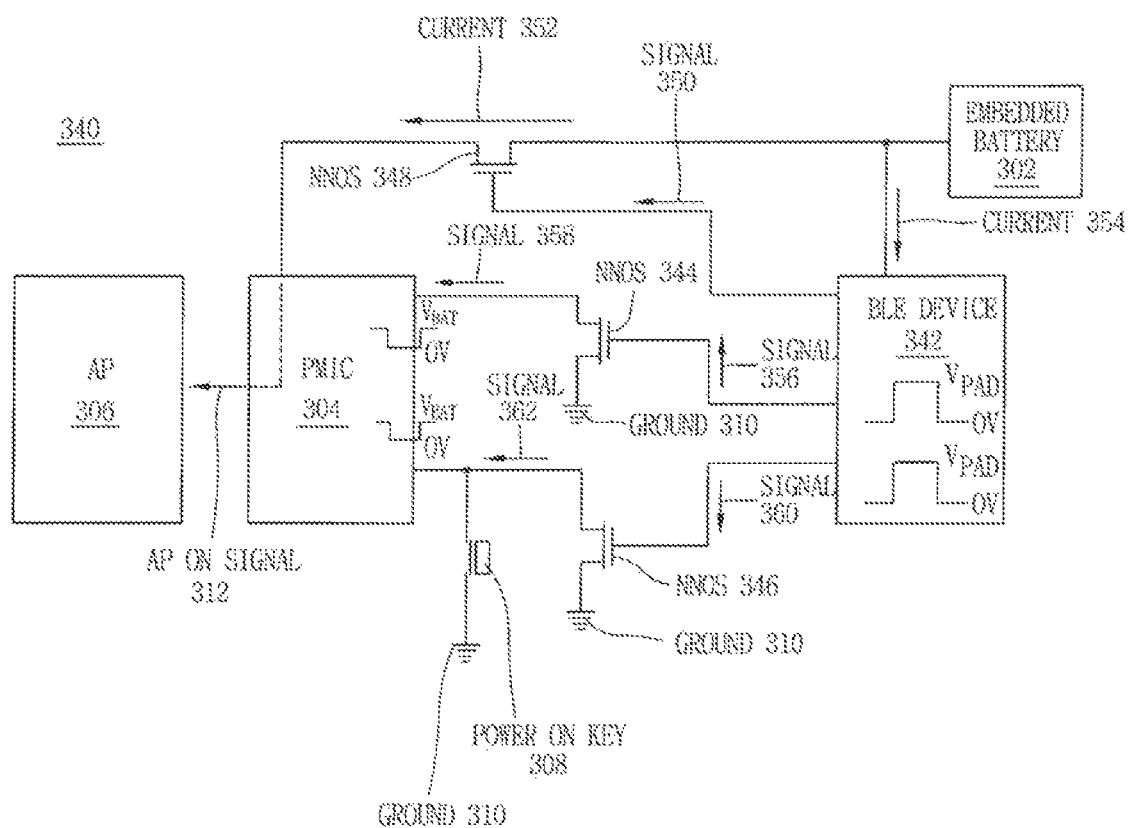
FIG. 3C illustrates a first exemplary circuit for reducing leakage current flowing from an embedded battery of a mobile device to a power management integrated circuit of the mobile device, according to one embodiment.
Figure 3D:
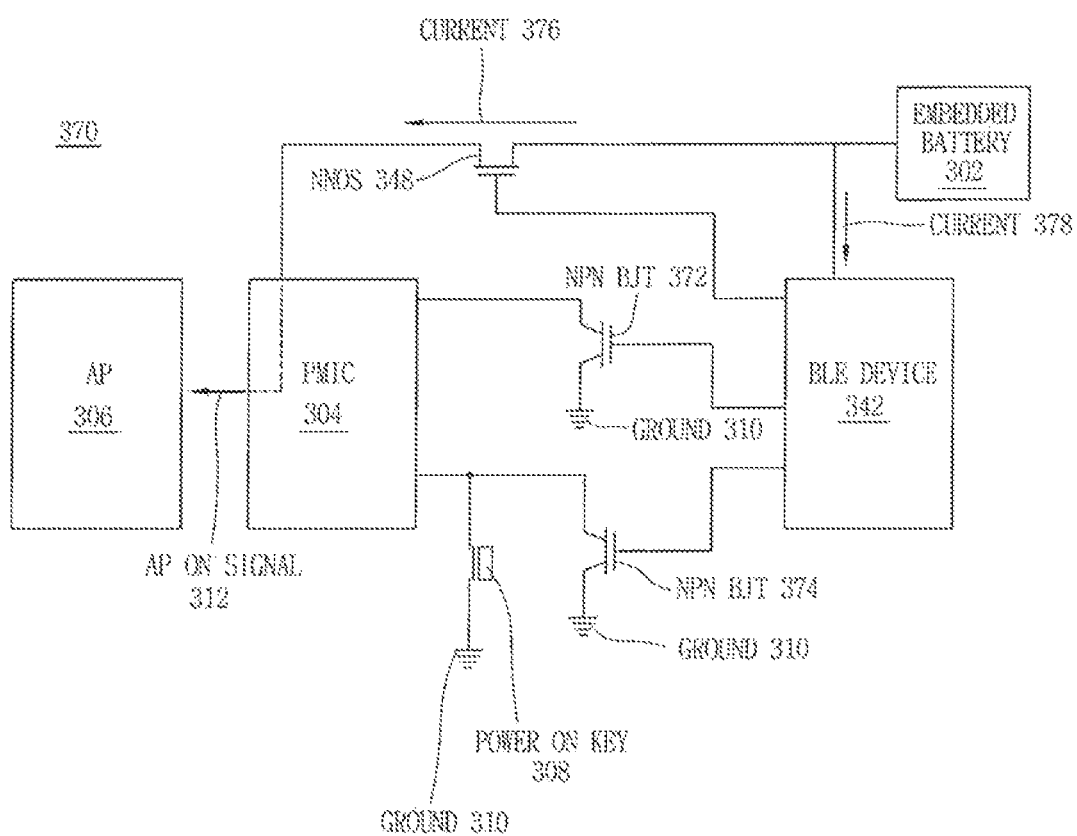
FIG. 3D illustrates a second exemplary circuit for reducing leakage current flowing from an embedded battery of a mobile device to a power management integrated circuit of the mobile device, according to one embodiment.
Figure 3E:
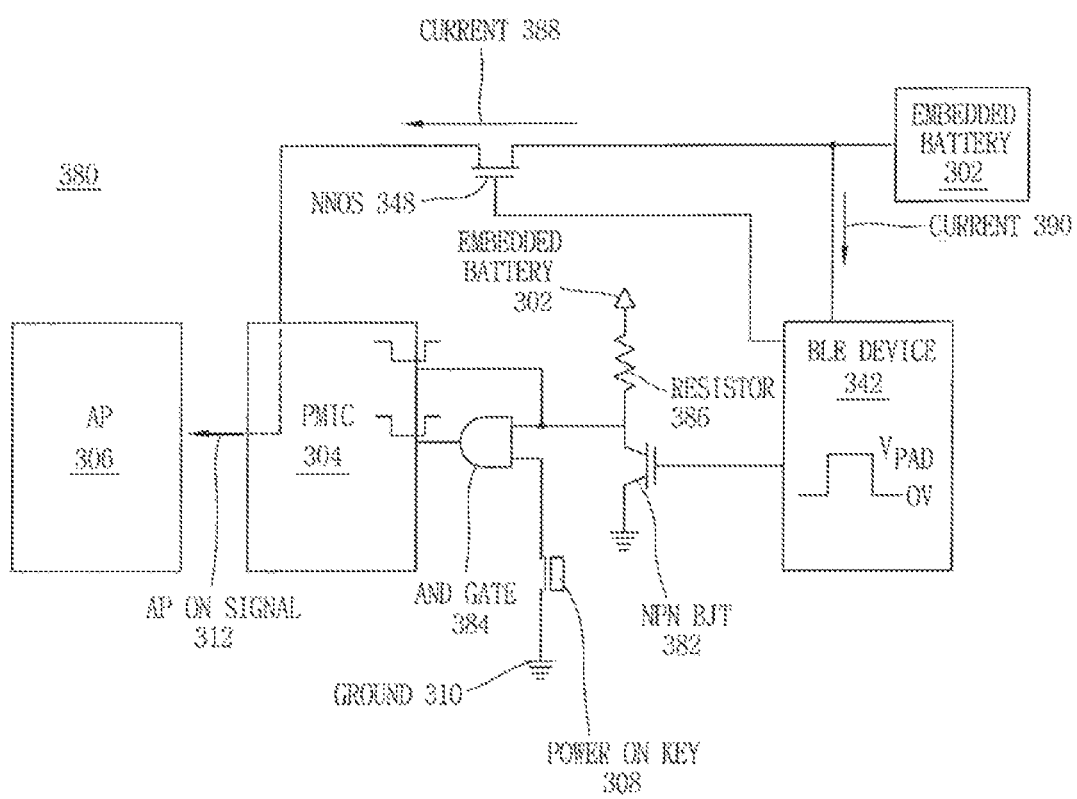
FIG. 3E illustrates a third exemplary circuit for reducing leakage current flowing from an embedded battery of a mobile device to a power management integrated circuit of the mobile device, according to one embodiment.

As will be illustrated in FIGS. 3C-3E, the switch device 324 may comprises a transistor, such as an n-channel metal-oxide-semiconductor file-effect transistor (NMOS), a PMOS, a BJT, etc. Further, the system 320 comprises a hardware module 322 coupled between the low power PAN module 110 and the PMIC 304, where the hardware module 110 is configured to forward the power on request signal received from the low power PAN module 110 to the PMIC 304. Additionally, the system 320 comprises the power on key 308 configured to process the turning on/off command of the AP 306 in response to the user's direct input rather than from an external signal to turn on/off the AP 306, as in the case of the AP ON request signal. It is appreciated that the operation of the low power PAN module 110, the PMIC 304, the AP 306 and the power on key 308 may be similar to those of the systems illustrated in FIG. 2A-2C.

FIG. 3C illustrates a first exemplary circuit 340 for reducing leakage current flowing from the embedded battery 302 of a mobile device to the PMIC 304 of the mobile device, according to one embodiment. In FIG. 3C, the circuit 340 comprises the PMIC 304, a switch device (e.g., an NMOS 348) electrically coupled to the embedded battery 302 and the PMIC 304, and a BLE device 342 coupled to the embedded battery 302, the PMIC 304, and the switch device. In one example embodiment, the BLE device 342 may draw a significantly less amount of current (e.g., 32 uA) than the amount of leakage current resulted in the conventional system 300 (e.g., in several hundred uA) in FIG. 3A.

In one embodiment, the BLE device 342 is configured to open the NMOS 348 to prevent current 352 (e.g., leakage current) flowing from the embedded battery 302 to the PMIC 304 while the AP 306 of the mobile device is off and to close the NMOS 348 in response to a receipt of an AP ON request signal to wake up the AP 306. In order to control the opening and closing of the NMOS 348, a signal 350 (e.g., low to open the NMOS 348 or high to close the NMOS 348) is forwarded from a GPIO port of the BLE device 342. As a result, the leakage current, which would have flown from the embedded battery 302 to the PMIC 304 as in the case of the conventional system 300 in FIG. 3A, is blocked as long as the NMOS 348 remains open. Further, the GPIO port of the BLE device 342 may forward another signal to close the NMOS 348 upon the receipt of the AP ON request signal so that the PMIC 304 may be supplied with power from the embedded battery 302 for its operation.

In one exemplary implementation, the circuit 340 comprises a first NMOS (e.g., NMOS 344) configured to forward the AP ON request signal to the PMIC 304, where a gate node of the first NMOS is coupled to the BLE device 342, a drain node of the first NMOS is coupled to the PMIC 304, and a source node of the first NMOS is coupled to ground 310. In addition, the circuit 340 further comprises a second NMOS (e.g., NMOS 346) configured to receive and forward a signal to deactivate the AP to the PMIC 304, where a gate node of the second NMOS is coupled to the BLE device 342, a drain node of the second NMOS is coupled to the PMIC 304, and a source node of the second NMOS is coupled to the ground 310. Further, the circuit 340 comprises the power on key 308 coupled to the drain node of the second NMOS.

In one exemplary operation, the BLE device 342 generates a signal 356 of a low, high, delay, low' pattern in response to an AP ON request signal from an external device. Then, the first NMOS amplifies the signal 356 to a signal 358 to the level of battery power (e.g., $V_{BAT}$), and the signal 358 is fed to an external signal on (EXT_ON) pin or port of the PMIC 304 which generates and forwards the AP ON signal 312 in response. Thus, by utilizing the EXT ON pin or port rather than an on key pin or port of the PMIC 304, the AP 306 or other processor may be able to request an inquiry to the PMIC 304 the source of the AP ON request signal, such as the power on key 308 or the AP ON request signal from an external device. Further, the AP 306 may be turned off remotely when the BLE device 342 upon processing a signal to turn off the AP 306 by forwarding a signal 360 which is amplified and forwarded as a signal 362 in the low, high, delay, low' pattern. The PMIC 304, upon receiving the signal 362, may generate an AP OFF signal to place the AP 306 in a sleep state. It is appreciated that the operation of the power on key 308 is similar to the same in the earlier figures.

FIG. 3D illustrates a second exemplary circuit 370 for reducing leakage current flowing from the embedded battery 302 of a mobile device to the PMIC 304 of the mobile device, according to one embodiment. In FIG. 3D, the circuit 370 comprises the PMIC 304, a switch device (e.g., the NMOS 348) electrically coupled to the embedded battery 302 and the PMIC 304, and the BLE device 342 coupled to the embedded battery 302, the PMIC 304, and the switch device. In one example embodiment, the BLE device 342 may draw a significantly less amount of current 378 (e.g., 32 uA) than the amount of leakage current resulted in the conventional system 300 (e.g., in several hundred uA) in FIG. 3A.

In one embodiment, the BLE device 342 is configured to open the NMOS 348 to prevent current 376 (e.g., leakage current) flowing from the embedded battery 302 to the PMIC 304 while the AP 306 of the mobile device is off and to close the NMOS 348 in response to a receipt of an AP ON request signal to wake up the AP 306. In order to control the opening and closing of the NMOS 348, a signal (e.g., low to open the NMOS 348 or high to close the NMOS 348) is forwarded from the GPIO port of the BLE device 342. As a result, the leakage current, which would have flown from the embedded battery 302 to the PMIC 304 as in the case of the conventional system 300 in FIG. 3A, is blocked as long as the NMOS 348 remains open. Further, the GPIO port of the BLE device 342 may forward another signal to close the NMOS 348 upon the receipt of the AP ON request signal so that the PMIC 304 may be supplied with power from the embedded battery 302 for its operation.

In one exemplary implementation, the circuit 370 comprises a first NPN BJT (e.g., NPN BJT 372) configured to forward the AP ON request signal to the PMIC 304, where a base node of the first NPN BJT is coupled to the BLE device 342, a collector node of the first NPN BJT is coupled to the PMIC 304, and an emitter node of the first NPN BJT is coupled to the ground 310. In addition, the circuit 370 further comprises a second NPN BJT (e.g., NPN BJT 374) configured to receive and forward a signal to deactivate the AP 306 to the PMIC 304, where a gate node of the second NPN BJT is coupled to the BLE device 342, a drain node of the second NPN BJT is coupled to the PMIC 304, and a source node of the second NPN BJT is coupled to the ground 310. Further, the circuit 370 comprises the power on key 308 coupled to the collector node of the second NPN BJT. It is appreciated that the operation of circuit 370 is similar to the circuit 340 in FIG. 3C.

FIG. 3E illustrates a third exemplary circuit 380 for reducing leakage current flowing from the embedded battery 302 of a mobile device to the PMIC 304 of the mobile device, according to one embodiment. In FIG. 3E, the circuit 380 comprises the PMIC 304, a switch device (e.g., the NMOS 348) electrically coupled to the embedded battery 302 and the PMIC 304, and the BLE device 342 coupled to the embedded battery 302, the PMIC 304, and the switch device. In one example embodiment, the BLE device 342 may draw a significantly less amount of current 390 (e.g., 32 uA) than the amount of leakage current resulted in the conventional system 300 (e.g., in several hundred uA) in FIG. 3A.

In one embodiment, the BLE device 342 is configured to open the NMOS 348 to prevent current 388 (e.g., leakage current) flowing from the embedded battery 302 to the PMIC 304 while the AP 306 of the mobile device is off and to close the NMOS 348 in response to a receipt of an AP ON request signal to wake up the AP 306. In order to control the opening and closing of the NMOS 348, a signal (e.g., low to open the NMOS 348 or high to close the NMOS 348) is forwarded from the GPIO port of the BLE device 342. As a result, the leakage current, which would have flown from the embedded battery 302 to the PMIC 304 as in the case of the conventional system 300 in FIG. 3A, is blocked as long as the NMOS 348 remains open. Further, the GPIO port of the BLE device 342 may forward another signal to close the NMOS 348 upon the receipt of the AP ON request signal so that the PMIC 304 may be supplied with power from the embedded battery 302 for its operation.

In one exemplary implementation, the circuit 380 comprises a NPN BJT 382 configured to forward an AP ON request signal from an external device via the BLE device 342 to the PMIC 304 and an AND gate 384, where a base node of the NPN BJT 382 is coupled to the BLE device 342, a collector node of the NPN BJT 382 is coupled to the embedded battery 302 and to a first input node of the AND gate 384, an emitter node of the NPN BJT 382 is coupled to the ground 310, and an output node of the AND gate 384 is coupled to the PMIC 304. Further, the circuit 380 comprises the power on key 308 coupled to a second input node of the AND gate 384. Additionally, a resistor 386 is coupled between the embedded battery 302 and the collector node of the NPN BJT 382, and the first input node of the AND gate 384 and a GPIO port of the PMIC 304 is directly coupled.

In one exemplary operation, the BLE device 342 generates a signal of a 'low, high, delay, low' pattern in response to an AP ON request signal from an external device. Then, the NPB BJT 382 amplifies the signal to the level of battery power (e.g., $V_{BAT}$), and the amplified signal is fed to the first input node of the AND gate 384 and the GPIO port of the PMIC 304. The amplified signal fed to both the on key pin or port, which is connected to the output node of the AND gate 384, and the GPIO pin or port is of the 'high, low, delay high' pattern. Thus, the AP 306 or other processor may be able to request an inquiry to the PMIC 304 to learn the source of the AP ON request signal, such as the power on key 308 or the AP ON request signal from an external device. That is, if the AP ON signal 312 is generated in response to the AP ON request signal from the external device, the state of the GPIO port and the state of the on key port at the PMIC 304 may have the same "high, low, delay, high" pattern. However, if the AP ON signal 312 is generated in response to the operation of the power on key 308, only the state of the on key port may have the "high, low, delay, high" pattern while the state of the GPIO port remains "high."

Figure 4:
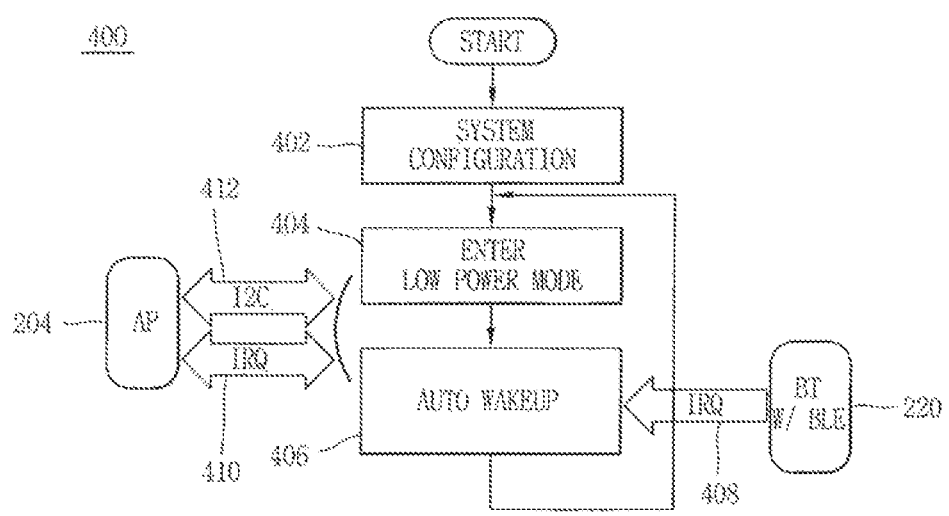
FIG. 4 illustrates a flow graph of an exemplary system for waking up an application processor of a mobile device, according one embodiment.

FIG. 4 illustrates an exemplary flow graph 400 of the system of the mobile device 200 in FIG. 2A, according to one embodiment. In operation 402, configurations of the system for waking up AP 202 are performed. It is appreciated that the system for waking up AP 202 may be a stand alone device (e.g., in a chip) or a part of the BT device with BLE feature 220 (e.g., or any other type of a low power PAN module). In addition, in operation 404, the system for waking up AP 202 enters a low power mode, where in one exemplary implementation, only 300 uA or less amount of current is drawn by the system for waking up AP 202. During the low power mode, the controller 208 of the system for waking up AP 202 monitors a signal from the BT device with BLE feature 220.

In operation 406, when an interrupt request (IRQ 408) is received from the BT with BLE feature 220, the controller 208 automatically wakes up the AP 204 via forwarding an interrupt request (IRQ 410) when authentication data forwarded from the BT with BLE feature 220 (e.g., as a part of a pairing request signal) is verified to be valid and an AP on request signal forwarded from the BT with BLE feature 220 is received and acknowledged by the controller 208. Then, the controller 208 communicates with the AP 204 via an inter-integrated circuit (12C 412) to transfer its control over the BT with BLE feature 220 to the AP 204. It is appreciated that although the method in FIG. 4 is described in terms of the mobile device 200 in FIG. 2A, the method may be applied to the mobile device 250, the mobile device 270, or the mobile devices comprising the systems or circuits described in FIGS. 3B-3E in a similar manner.

Figure 5:
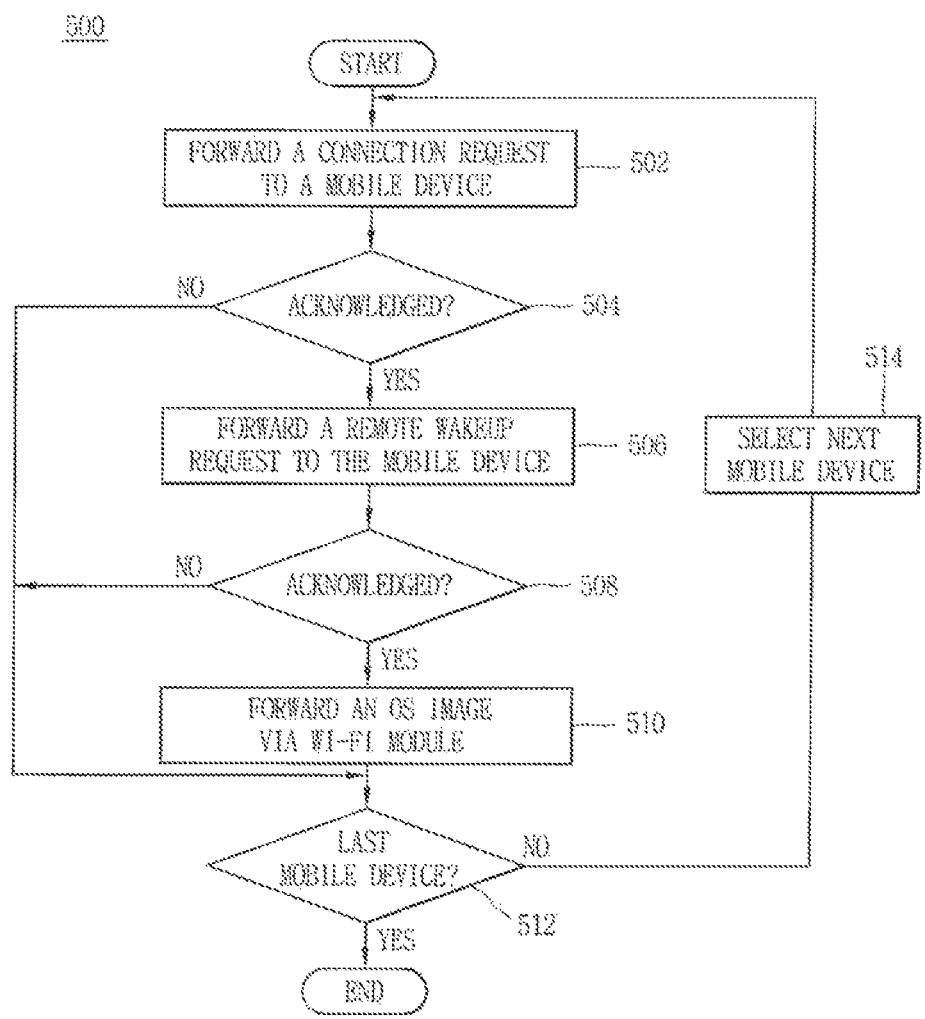
FIG. 5 illustrates a process flow chart of an exemplary method of a server for remotely waking up an application processor of a mobile device, according to one embodiment.

FIG. 5 illustrates a process flow chart 500 of an exemplary method of a server for remotely waking up an application processor of a mobile device, according to one embodiment. In keeping with the previous examples, particular components described with respect to FIG. 1 are referenced as performing the process in FIG. 5. It should be noted that the components that are referred to as performing the process are for illustrative purposes only. In some implementations, other components, or a different combination of components within a system, may instead perform the process in FIG. 5.

In operation 502, as illustrated in FIG. 1, the connection request signal 114 (e.g., a pairing request) is forwarded to the mobile device 104A via the PAN module 118 (e.g., the BT device 122). If the connection request signal 114 (e.g., a pairing request signal) is not acknowledged by the mobile device 104A in operation 504, the connection request signal 114 is sent to next mobile device (e.g., the mobile device 1048) unless the present mobile device is the last one. If the connection request signal 114 (e.g., the pairing request signal) is acknowledged by the mobile device 104A in operation 504, the server 102 forwards a remote wakeup request signal (e.g., the AP on request signal 116) to the mobile device 104A in operation 506. If the remote wakeup request signal is not acknowledged by the mobile device 104A in operation 508, the remote wakeup request signal is sent to next mobile device (e.g., the mobile device 104B) unless the present mobile device is the last one.

If the remote wakeup request signal is acknowledged by the mobile device 104A in operation 508, the OS image 138 is forwarded to the mobile device 104A using the Wi-Fi module 134. If the present mobile device is determined as the last mobile device (e.g., the mobile device 104N), the operation of waking up each mobile device and performing the download of the OS image 138 are brought to end. Otherwise, operations 502 through 510 are repeated once next mobile device is selected in operation 514.

It is appreciated that the methods disclosed in FIG. 5 may be implemented in a form of a machine-readable medium embodying a set of instructions that, when executed by a machine, cause the machine to perform any of the operations disclosed herein.

Figure 6:
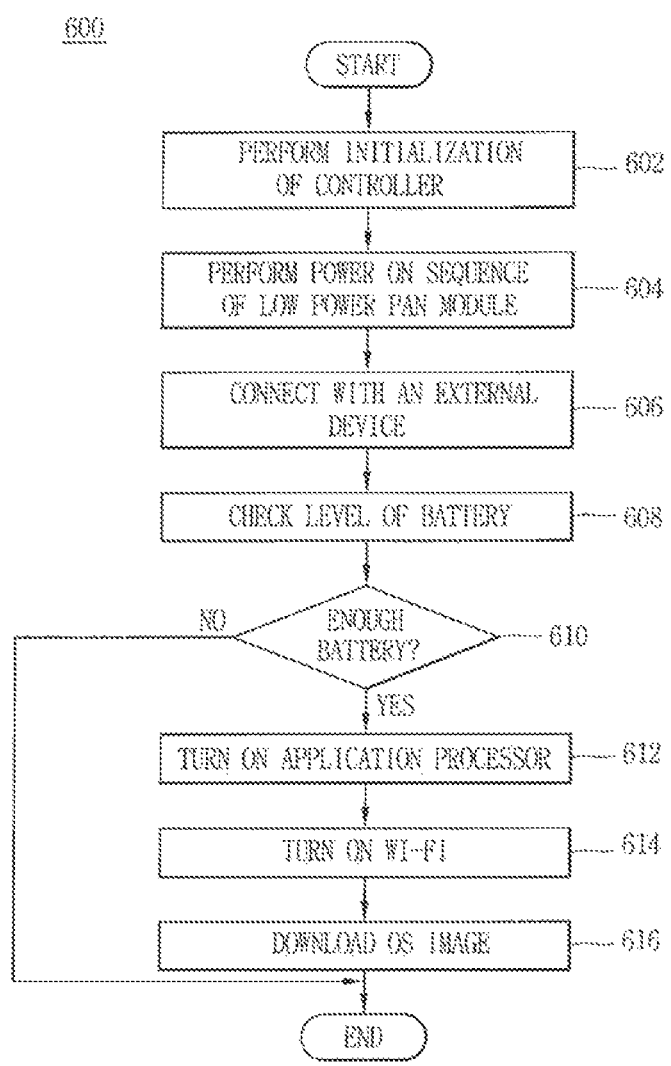
FIG. 6 illustrates a process flow chart of an exemplary method of a mobile device for waking up an application processor of a mobile device, according to one embodiment.

FIG. 6 illustrates a process flow chart 600 of an exemplary method of a mobile device for waking up an application processor of the mobile device, according to one embodiment. In keeping with the previous examples, particular components described with respect to FIG. 2A are referenced as performing the process in FIG. 6. It should be noted that the components that are referred to as performing the process are for illustrative purposes only. In some implementations, other components, or a different combination of components within a system or device, may instead perform the process in FIG. 6.

In operation 602, as illustrated in FIG. 2A, the initialization of the controller 208 is performed as the battery 214 (e.g., fully charged) is installed on the mobile device 200. Then, in operation 604, the power on sequence of the low power PAN module 206 is performed. From this on, until the AP 204 is turned on by a request from an external device, the controller 208 as well as the low power PAN module 206 remains in standby mode, thus consuming minimal amount of power from the battery 214. This way, a mobile device (e.g., the mobile device 200) in package can be configured to attune to a wake up signal (e.g., the connection request signal 210 and the AP on request signal 212) from an external device (e.g., the server 102) while consuming minimal amount of power to maintain the monitoring and controlling system and/or device (e.g. the system for waking up AP 202) in standby mode. As the low power PAN module 206 as well as the controller 208 can be maintained using quiescent current from the battery 214, the monitoring and controlling system and/or device may be maintained for many months without any recharging.

When the system for waking up AP 202 is in standby mode in operation 606, the mobile device 200 may connect with the external device when the connection request signal 210 is verified. In operation 608, upon receipt of the AP on request signal 212 from the external device, the level of the battery 214 is checked. If there isn't enough battery required to perform a single task satisfactorily, the mobile device 200 may refrain from acknowledging the external device in response to the AP on request signal 212 and ends the process illustrated in FIG. 6 for the mobile device 200. On the other hand, if there is enough battery in operation 610, the AP 204 of the mobile device 200 is turned on in operation 612.

Then, in operation 614, the AP 204 turns on the Wi-Fi module 136 of FIG. 1 to process data transferred from the external device. The Wi-Fi module 136 (e.g., and/or the Wi-Fi module 134 for the server 102) is selected to transfer large files or large amount of data since Wi-Fi is more equipped to transfer data faster and in farther distance. In operation 616, the OS image 138 is downloaded from the external device to the mobile device 200, thus completing the process. Once the download of the OS image 138 (e.g., or any other task such as remotely running an application) is completed, the AP 204 of the mobile device 200 may be turned off and the system for waking up AP 202 may return to the standby mode until there is another wakeup of the AP 204 or the mobile device 200 is in operation.

It is appreciated that the methods disclosed in FIG. 6 may be implemented in a form of a machine-readable medium embodying a set of instructions that, when executed by a machine, cause the machine to perform any of the operations disclosed herein. It is further appreciated that although the method in FIG. 6 is described in terms of the mobile device 200 in FIG. 2A, the method may be applied to the mobile device 250 in FIG. 2B, the mobile device 270 in FIG. 2C, or the mobile devices comprising the systems or circuits described in FIG. 3B-3E in a similar manner.

Figure 7:
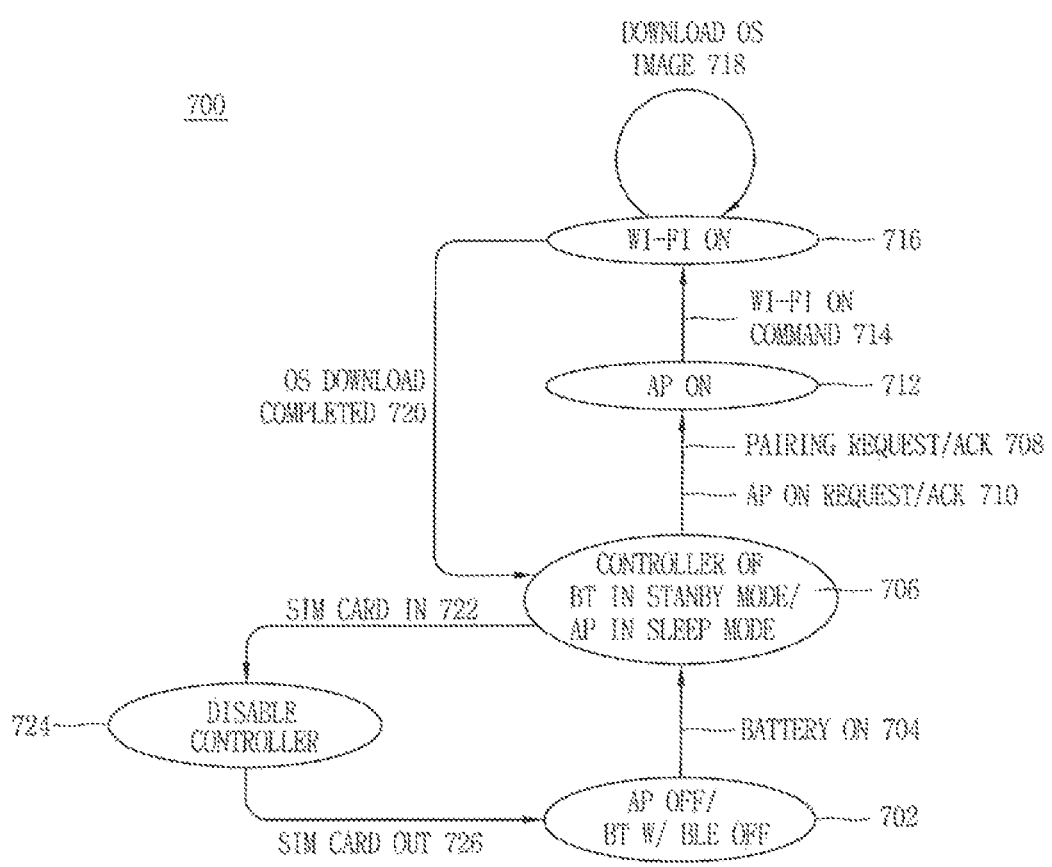
FIG. 7 is a state diagram which illustrates various states of an exemplary mobile device configured for waking up an application processor of a mobile device, according to one embodiment.

FIG. 7 is a state diagram 700 which illustrates various states of an exemplary mobile device configured for waking up an application processor of the mobile device, according to one embodiment. In keeping with the previous examples, particular components in FIG. 1 are referenced to describe the state diagram 700 in FIG. 7. It should be noted that the components that are referred are for illustrative purposes only. In some implementations, other components, or a different combination of components within a system or device, may be used to illustrate the state diagram 700 in FIG. 7.

In FIG. 7, AP OFF/BT W/BLE OFF state 702 is where the mobile device 104A or any one of the mobile devices 104A-N in FIG. 1 is without any power source (e.g., the battery 106). As the battery 106 is inserted to the mobile device 104A, as illustrated in 'battery on' 704 during the packaging process of the mobile device 200, the controller 112 and/or the BT device with BLE feature 124 of the mobile device 104A are switched to the standby mode, where the controller 112 is configured to remain alert for a signal from an external device. During CONTROLLER OF BT W/BLE IN STANDBY MODE/AP IN SLEEP MODE state 706, the AP 108 remains in sleep state, thus drawing minimal amount power from the battery 106. This way, the controller 112 of the BT device with BLE feature can remain in the standby mode (e.g., several months) with just quiescent current supplied from the battery 106.

Then, upon the processing of the pairing request and the AP on request, as in 'pairing request/ack' 708 and 'AP on request/ack' 710, the state of the mobile device 104A is moved to AP ON state 712. In the AP ON state 712, the AP 108 of the mobile device 104A is turned on, and the AP 108 takes over the control of the BT device with BLE feature 124. Then, the AP 108 issues a 'Wi-Fi on command' 714 to turn the Wi-Fi module 136, thus arriving at WI-FI ON state 716. When the mobile device 104A is in the Wi-Fi ON state 716, the download of the OS image 138 from the server 102 is performed, as illustrated in step 'download OS image' 718. Further, as the download of the OS image 138 is completed in 720 COS download completed), the state of the mobile device 104A returns to the CONTROLLER OF BT W/BLE IN STANDBY MODE/AP IN SLEEP MODE state 706, where the controller 112 is in the standby mode while the AP 108 is in sleep or deep sleep mode. Then, as the mobile device 104A is brought out from its package and accessed by a user, as 'SIM card in' 722 indicates, the state of the mobile device 104A is transformed to DISABLE CONTROLLER STATE 724, where the controller 112 is disabled in order to prevent the user to temper with the mobile device 200. Further, as the SIM card is brought out as the mobile device 104A is in for service, as indicated in 'SIM card out' 726, the state of the mobile device 104A changes to the AP OFF/BT W/BLE OFF state 702.

In various embodiments, the systems, circuits, devices, and methods described in FIGS. 1-7 may prolong the life of the embedded battery in the mobile device. The above-described systems, circuits, devices, and methods may provide various embodiments that aim to minimize power consumed by the mobile device through monitoring the AP ON signal using a low power PAN module, such as the BLE device and through reducing leakage current drawn by several components of the mobile device from the embedded battery. Thus, the various embodiments disclosed in the present disclosure provide more versatile, efficient methods, systems and devices for prolonging the life of the embedded battery in the mobile device.

The various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). Further, the various electrical structure and methods may be embodied using transistors, logic gates, and/or electrical circuits (e.g., application specific integrated circuit (ASIC)). Although the present embodiments have been described with reference to specific example embodiments, it will be evident that various modifications and changes may be made to these embodiments without departing from the broader spirit and scope of the various embodiments.

What is claimed is:

1. A system for reducing leakage current in a mobile device with an embedded battery, the system comprising:
   a power management integrated circuit (PMIC);
   a switch device electrically coupled to the embedded battery and the PMIC; and
   a low power personal area network (PAN) module coupled to the embedded battery, the PMIC, and the switch device, the low power PAN module configured to maintain the switch device in an open state while an application processor (AP) of the mobile device is off and to close the switch device in response to a receipt of an AP ON request signal to wake up the AP, wherein the open state of the switch device blocks leakage current flowing from the battery to the PMIC.

2. The system of claim 1, wherein the low power PAN module comprises a Bluetooth device with BLE feature.

3. The system of claim 1, wherein the low power PAN module comprises a BLE device.

4. The system of claim 1, wherein the switch device comprises a transistor.

5. The system of claim 4, wherein the transistor comprises an n-channel metal-oxide-semiconductor file-effect transistor (NMOS).

6. The system of claim 1, further comprising a hardware module coupled between the low power PAN module and the PMIC, wherein the hardware module is configured to forward the power on request signal received from the low power PAN module to the PMIC.

7. The system of claim 6, wherein the hardware module comprises a first NMOS configured to forward the AP ON request signal to the PMIC, and wherein a gate node of the first NMOS is coupled to the low power PAN module, a drain node of the first NMOS is coupled to the PMIC, and a source node of the first NMOS is coupled to ground.

8. The system of claim 7, wherein the hardware module further comprises a second NMOS configured to receive and forward a signal to deactivate the AP to the PMIC, and wherein a gate node of the second NMOS is coupled to the low power PAN module, a drain node of the second NMOS is coupled to the PMIC, and a source node of the second NMOS is coupled to the ground.

9. The system of claim 8, further comprising a power on key coupled to the drain node of the second NMOS.

10. The system of claim 6, wherein the hardware module comprises a first NPN bipolar junction transistor (BJT) configured to forward the AP ON request signal to the PMIC, and wherein a base node of the first NPN BJT is coupled to the low power PAN module, a collector node of the first NPN BJT is coupled to the PMIC, and an emitter node of the first NPN BJT is coupled to ground.

11. The system of claim 10, wherein the hardware module further comprises a second NPN BJT configured to receive and forward a signal to deactivate the AP to the PMIC, and wherein a base node of the second NPN BJT is coupled to the low power PAN module, a collector node of the second NPN BJT is coupled to the PMIC, and an emitter node of the second NPN BJT is coupled to the ground.

12. The system of claim 11, further comprising a power on key coupled to the collector node of the second NPN BJT.

13. The system of claim 6, wherein the hardware module comprises:
   a NPN BJT configured to forward the AP ON request signal to the PMIC; and
   an AND gate, wherein a base node of the NPN BJT is coupled to the low power PAN module, a collector node of the NPN BJT is coupled to the embedded battery and to a first input node of the AND gate, an emitter node of the NPN BJT is coupled to ground, and an output node of the AND gate is coupled to the PMIC.

14. The system of claim 13, further comprising a power on key coupled to a second input node of the AND gate.

15. The system of claim 14, wherein the PMIC comprises a general purpose input output (GPIO) port configured to be in an active state in response to the AP ON request signal detected at the NPN BJT and be in an inactive state when the power on key is activated.

16. A mobile device comprising:
   an embedded battery;
   a power management integrated circuit (PMIC);
   an application processor (AP) coupled to the PMIC;
   a switch device electrically coupled to the embedded battery and the PMIC; and
   a low power personal area network (PAN) module coupled to the embedded battery, the PMIC, and the switch device, the low power PAN module configured to maintain the switch device in an open state while the AP of the mobile device is off and to close the switch device in response to a receipt of an AP ON request signal to wake up the AP, wherein the open state of the switch device blocks leakage current flowing from the battery to the PMIC.

17. The mobile device of claim 16, wherein the low power PAN module comprises a BLE device.

18. The mobile device of claim 16, wherein the switch device comprises a transistor.

19. The mobile device of claim 18, wherein the transistor comprises a n-channel metal-oxide-semiconductor file-effect transistor (NMOS).

20. A system for reducing leakage current in a mobile device with an embedded battery, the system comprising:
- a power management integrated circuit (PMIC);
- a switch device electrically coupled to the embedded battery and the PMIC; and
- a BLE device coupled to the embedded battery, the PMIC, and the switch device, the BLE device configured to maintain the switch device in an open state while an AP of the mobile device is off and to close the switch device in response to a receipt of an AP ON request signal to wake up the AP, wherein the open state of the switch device blocks leakage current flowing from the battery to the PMIC.

* * * * *